United States Patent
Britton et al.

(10) Patent No.: US 7,302,440 B2
(45) Date of Patent: Nov. 27, 2007

(54) METHODS AND APPARATUS FOR STATISTICAL DATA ANALYSIS AND REDUCTION FOR AN ENTERPRISE APPLICATION

(75) Inventors: Colin P. Britton, Lexington, MA (US); Ashok Kumar, North Billerica, MA (US); David Bigwood, Lexington, MA (US); Howard Greenblatt, Wayland, MA (US)

(73) Assignee: Metatomix, Inc., Waltham, MA (US)

( * ) Notice: Subject to any disclaimer, the term of this patent is extended or adjusted under 35 U.S.C. 154(b) by 313 days.

(21) Appl. No.: 10/302,727

(22) Filed: Nov. 21, 2002

(65) Prior Publication Data

US 2003/0158851 A1    Aug. 21, 2003

Related U.S. Application Data

(63) Continuation-in-part of application No. 09/917,264, filed on Jul. 27, 2001, now Pat. No. 7,058,637, and a continuation-in-part of application No. 10/051,619, filed on Oct. 29, 2001, now Pat. No. 6,856,992.

(60) Provisional application No. 60/332,219, filed on Nov. 21, 2001, provisional application No. 60/332,053, filed on Nov. 21, 2001.

(51) Int. Cl.
*G06F 7/00* (2006.01)
*G06F 17/00* (2006.01)

(52) U.S. Cl. ...................... 707/101; 707/100

(58) Field of Classification Search ............... 707/101, 707/100, 102, 204, 200; 709/201, 220
See application file for complete search history.

(56) References Cited

U.S. PATENT DOCUMENTS

| | | | |
|---|---|---|---|
| 5,374,932 A | 12/1994 | Wyschogrod | |
| 5,379,387 A | 1/1995 | Carlstedt | |
| 5,519,618 A | 5/1996 | Kastner | |
| 5,822,780 A | 10/1998 | Schutzman | 711/165 |
| 5,841,673 A | 11/1998 | Kobayashi | |

(Continued)

OTHER PUBLICATIONS

Cormen et al., Introduction to Algorithms, 2000, MIT Press, 24th printing, pp. 219-226.*

(Continued)

*Primary Examiner*—Sam Rimell
*Assistant Examiner*—Jacob F. Betit
(74) *Attorney, Agent, or Firm*—McClennen & Fish LLP; David J. Powsner; Joshua T. Matt (57) ABSTRACT

The invention provides methods of time-wise data reduction that include the steps of inputting data from a source; summarizing that data according to one or more selected epochs in which it belongs; and generating for each such selected epoch one or more RDF triples characterizing the summarized data. The data source may be, for example, a database, a data stream or otherwise. The selected epoch may be a second, minute, hour, week, month, year, or so forth. The triples may be output in the form of RDF document objects. These can be stored, for example, in a hierarchical data store such as, for example, a WebDAV server. Triples parsed from the document objects may be maintained in a relational store that is organized, for example, according to a hashed with origin approach.

16 Claims, 5 Drawing Sheets

U.S. PATENT DOCUMENTS

| | | | |
|---|---|---|---|
| 5,907,837 A | 5/1999 | Ferrel et al. ............... 707/3 |
| 5,974,441 A | 10/1999 | Rogers et al. | |
| 6,122,632 A | 9/2000 | Botts et al. | |
| 6,130,679 A | 10/2000 | Chen | |
| 6,137,797 A | 10/2000 | Bass et al. | |
| 6,144,997 A | 11/2000 | Lamming et al. | |
| 6,177,932 B1 | 1/2001 | Galdes et al. | |
| 6,185,516 B1 | 2/2001 | Hardin | |
| 6,240,417 B1 | 5/2001 | Eastwick et al. | |
| 6,243,713 B1 | 6/2001 | Nelson et al. | |
| 6,330,554 B1 | 12/2001 | Altschuler et al. | |
| 6,389,460 B1 | 5/2002 | Stewart et al. | |
| 6,405,251 B1 | 6/2002 | Bullard | |
| 6,429,870 B1 | 8/2002 | Chen | |
| 6,446,200 B1 | 9/2002 | Ball | |
| 6,577,769 B1 | 6/2003 | Kenyon | |
| 6,594,662 B1* | 7/2003 | Sieffert et al. ............... 707/10 |
| 6,625,657 B1 | 9/2003 | Bullard | |
| 6,631,369 B1* | 10/2003 | Meyerzon et al. ............ 707/4 |
| 6,678,679 B1 | 1/2004 | Bradford | |
| 6,692,256 B2* | 2/2004 | Chan et al. ............... 434/118 |
| 6,701,314 B1* | 3/2004 | Conover et al. ............ 707/7 |
| 6,751,663 B1 | 6/2004 | Farrell | |
| 2002/0049603 A1 | 4/2002 | Mehra et al. | |
| 2002/0049788 A1 | 4/2002 | Lipkin et al. | |
| 2002/0059566 A1 | 5/2002 | Delcambre et al. | |
| 2002/0091678 A1 | 7/2002 | Miller et al. | |
| 2002/0178232 A1 | 11/2002 | Ferguson | |
| 2003/0014399 A1 | 1/2003 | Hansen et al. | |
| 2003/0050834 A1 | 3/2003 | Caplan | |
| 2003/0050927 A1 | 3/2003 | Hussam | |
| 2003/0050929 A1 | 3/2003 | Bookman et al. | |
| 2003/0074369 A1 | 4/2003 | Scheutze et al. | |
| 2003/0109951 A1 | 6/2003 | Hsiung et al. | |
| 2003/0229529 A1 | 12/2003 | Mui et al. | |

OTHER PUBLICATIONS

"Inkling: RDF Query Using SquishQL," downloaded from http://swordfish.rdfweb.org/rdfquery/ on Mar. 20, 2003, 2 pages.

"RdfDB Query Language," downloaded from http://www.guha.com/rdfdb/query.html on Mar. 20, 2003, 4 pages.

"RDQL—RDF Data Query Language," Hewlett-Packard Company, © 1994-2003, downloaded from http://www.hpl.hp.com/semweb/rdql.htm on Mar. 20, 2003, 3 pages.

Berniers-Lee et al. *RFC 2396: Uniform Resource Identifiers (URI): Generic Syntax* (Aug. 1998) http://www.cs.tut.fi/ ~ jkorpela/rfc/2396/full.html, 23 pages, downloaded on Feb. 20, 2003.

Forgy, Charles L. "Rete: A Fast Algorithm for the Many Pattern/Many Object Pattern Match Problem," *Artificial Intelligence* vol. 19 (1982) pp. 17-37.

Melnik, Sergey, "Storing RDF in a relational databse," http://www-db.stanford.edu/ ~ melnik/rdf/db.html, 5 pages, downloaded on 20/20/2003.

Quinlan, J. R., "Induction of Decision Trees," *Machine Learning* vol. 1 (1986) pp. 18-106.

*Resource Description Framework (RDF) Model and Syntax Specification* W3C Recommendation (Feb. 22, 1999) http://www.w3.org.TR/1999/REC-rdf-syntax-19990222/, 34 pages, downloaded on Feb. 20, 2003.

"The Rete Algorithm," http://herzberg.ca.sandia.gov/jess/docs/52/rete.html, 3 pages, downloaded on Feb. 20, 2003.

* cited by examiner

METHODS AND APPARATUS FOR STATISTICAL DATA ANALYSIS AND REDUCTION FOR AN ENTERPRISE APPLICATION

This application claims the benefit of priority of U.S. Provisional Patent Application Ser. No. 60/332,053, filed Nov. 21, 2001, entitled "Methods And Apparatus For Querying A Relational Database In A System For Real-Time Business Visibility" and U.S. Provisional Patent Application Ser. No. 60/332,219, filed on Nov. 21, 2001, entitled "Methods And Apparatus For Calculation and Reduction of Time-Series Metrics From Event Streams Or Legacy Databases In A System For Real-Time Business Visibility." This application is also a continuation-in-part of U.S. patent application Ser. No. 09/917,264, filed Jul. 27, 2001 now U.S. Pat. No. 7,058,637, entitled "Methods and Apparatus for Enterprise Application Integration" and U.S. patent application Ser. No. 10/051,619, filed Oct. 29, 2001 now U.S. Pat. No. 6,856,992, entitled "Methods And Apparatus For Real-Time Business Visibility Using Persistent Schema-Less Data Storage." The teachings of all of the foregoing applications are incorporated herein by reference.

BACKGROUND OF THE INVENTION

The invention pertains to digital data processing and, more particularly, to methods and apparatus for enterprise business visibility and insight using real-time reporting tools.

It is not uncommon for a single enterprise to have several separate database systems to track internal and external planning and transactional data. Such systems might have been developed at different times throughout the history of the enterprise and, therefore, represent differing generations of computer technology. For example, a marketing database system tracking customers may be ten years old, while an enterprise resource planning (ERP) system tracking inventory might be two or three years old. Integration between these systems is difficult at best, consuming specialized programming skill and constant maintenance expenses.

A major impediment to enterprise business visibility is the consolidation of data from these disparate legacy databases with one another and with that from newer e-commerce databases. For instance, inventory on-hand data gleaned from a legacy ERP system may be difficult to combine with customer order data gleaned from web servers that support e-commerce (and other web-based) transactions. This is not to mention difficulties, for example, in consolidating resource scheduling data from the ERP system with the forecasting data from the marketing database system.

An object of this invention is to provide improved methods and apparatus for digital data processing and, more particularly, for enterprise business visibility and insight (hereinafter, "enterprise business visibility").

A further object is to provide such methods and apparatus as can rapidly and accurately retrieve information responsive to user inquiries.

A further object of the invention is to provide such methods and apparatus as can be readily and inexpensively integrated with legacy, current and future database management systems.

A still further object of the invention is to provide such methods and apparatus as can be implemented incrementally or otherwise without interruption of enterprise operation.

Yet a still further object of the invention is to provide such methods and apparatus as to facilitate ready access to up-to-date enterprise data, regardless of its underlying source.

Yet still a further object of the invention is to provide such methods and apparatus as permit flexible presentation of enterprise data in an easily understood manner.

SUMMARY OF THE INVENTION

The aforementioned are among the objects attained by the invention, one aspect of which provides a method of time-wise data reduction that includes the steps of inputting data from a source; summarizing that data according to one or more selected epochs in which it belongs; and generating for each such selected epoch one or more RDF triples characterizing the summarized data. The data source may be, for example, a database, a data stream or otherwise. The selected epoch may be a second, minute, hour, week, month, year, or so forth.

Further aspects of the invention provide a method as described above including the step of outputting the RDF triples in the form of RDF document objects. These can be stored, for example, in a hierarchical data store such as, for example, a WebDAV server.

Still further related aspects of the invention provide for parsing triples from the RDF document objects and storing them in a relational data store. A further related aspect of the invention provides for storing the triples in a relational store that is organized according to a hashed with origin approach.

Still yet other aspects of the invention provide for retrieving information represented by the triples in the hierarchical and/or relational data stores, e.g., for presentation to a user. Related aspects of the invention provide for retrieving triples containing time-wise reduced data, e.g., for presentation to a user.

Related aspects of the invention provide methods as described above including a summarizing the input data according to one or more epochs of differing length. Further aspects of the invention provide methods as described above including querying the source, e.g., a legacy database, in order to obtain the input data. Related aspects of the invention provides for generating such queries in SQL format.

Still other aspects of the invention provide methods as described above including the step of inputting an XML file that identifies one or more sources of input data, one or more fields thereof to be summarized in the time-wise reduction, and/or one or more epochs for which those fields are to be summarized.

Further aspects of the invention provide methods as described above including responding to an input datum by updating summary data for an epoch of the shortest duration, e.g., a store of per day data. Related aspects of the invention provide for updating a store of summary data for epochs of greater duration, e.g., stores of per week or per month data, from summary data maintained in a store for an epoch of lesser duration, e.g., a store of per day data.

These and other aspects of the invention are evident in the drawings and in the description that follows.

BRIEF DESCRIPTION OF THE DRAWINGS

The foregoing features of this invention, as well as the invention itself, may be more fully understood from the following detailed description of the drawings in which.

DETAILED DESCRIPTION OF THE ILLUSTRATED EMBODIMENT

Figure 1:
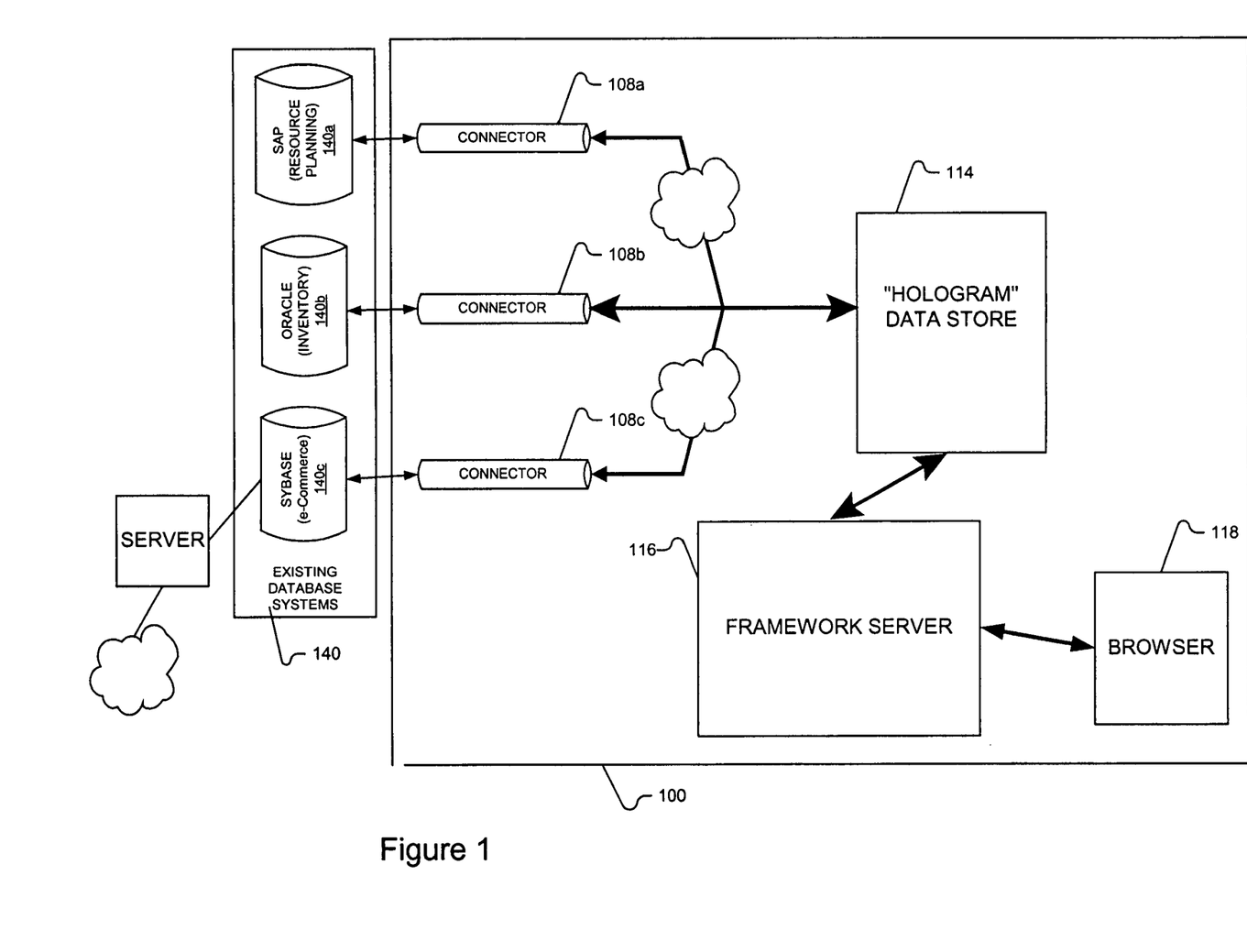
FIG. 1 depicts an improved enterprise business visibility and insight system according invention.

FIG. 1 depicts a real-time enterprise business visibility and insight system according to the invention. The illustrated system 100 includes connectors 108 that provide software interfaces to legacy, e-commerce and other databases 140 (hereinafter, collectively, "legacy databases"). A "hologram" database 114 (hereinafter, "data store" or "hologram data store"), which is coupled to the legacy databases 140 via the connectors 108, stores data from those databases 140. A framework server 116 accesses the data store 114, presenting selected data to (and permitting queries from) a user browser 118. The server 116 can also permit updates to data in the data store 114 and, thereby, in the legacy databases 140.

Legacy databases 140 represent existing (and future) databases and other sources of information (including data streams) in a company, organization or other entity (hereinafter "enterprise"). In the illustration, these include a retail e-commerce database (e.g., as indicated by the cloud and server icons adjacent database 140c) maintained with a Sybase® database management system, an inventory database maintained with an Oracleg database management system and an ERP database maintained with a SAP® Enterprise Resource Planning system. Of course, these are merely examples of the variety of databases or other sources of information with which methods and apparatus as described herein can be used. Common features of illustrated databases 140 are that they maintain information of interest to an enterprise and that they can be accessed via respective software application program interfaces (API) or other mechanisms known in the art.

Connectors 108 serve as an interface to legacy database systems 140. Each connector applies requests to, and receives information from, a respective legacy database, using that database's API or other interface mechanism. Thus, for example, connector 108a applies requests to legacy database 140a using the corresponding SAP API; connector 108b, to legacy database 140b using Oracle API; and connector 108c, to legacy database 140c using the corresponding Sybase API.

In the illustrated embodiment, these requests are for purposes of accessing data stored in the respective databases 140. The requests can be simple queries, such as SQL queries and the like (e.g., depending on the type of the underlying database and its API) or more complex sets of queries, such as those commonly used in data mining. For example, one or more of the connectors can use decision trees, statistical techniques or other query and analysis mechanisms known in the art of data mining to extract information from the databases.

Specific queries and analysis methodologies can be specified by the hologram data store 114 or the framework server 116 for application by the connectors. Alternatively, the connectors themselves can construct specific queries and methodologies from more general queries received from the data store 114 or server 116. For example, request-specific items can be "plugged" into query templates thereby effecting greater speed and efficiency.

Regardless of their origin, the requests can be stored in the connectors 108 for application and/or reapplication to the respective legacy databases 108 to provide one-time or periodic data store updates. Connectors can use expiration date information to determine which of a plurality of similar data to return to the data store, or if dates are absent, the connectors can mark returned data as being of lower confidence levels.

Data and other information (collectively, "messages") generated by the databases 140 in response to the requests are routed by connectors to the hologram data store 114. That other information can include, for example, expiry or other adjectival data for use by the data store in caching, purging, updating and selecting data. The messages can be cached by the connectors 108, though, they are preferably immediately routed to the store 114.

The hologram data store 114 stores data from the legacy databases 140 (and from the framework server 116, as discussed below) as RDF triples. The data store 114 can be embodied on any digital data processing system or systems that are in communications coupling (e.g., as defined above) with the connectors 108 and the framework server 116. Typically, the data store 114 is embodied in a workstation or other high-end computing device with high capacity storage devices or arrays, though, this may not be required for any given implementation.

Though the hologram data store 114 may be contained on an optical storage device, this is not the sense in which the term "hologram" is used. Rather, it refers to its storage of data from multiple sources (e.g., the legacy databases 140) in a form which permits that data to be queried and coalesced from a variety of perspectives, depending on the needs of the user and the capabilities of the framework server 116.

To this end, a preferred data store 114 stores the data from the legacy databases 140 in subject-predicate-object form, e.g., RDF triples, though those of ordinary skill in the art will appreciate that other forms may be used as well, or instead. By way of background, RDF is a way of expressing the properties of items of data. Those items are referred to as subjects. Their properties are referred to as predicates. And, the values of those properties are referred to as objects. In RDF, an expression of a property of an item is referred to as a triple, a convenience reflecting that the expression contains three parts: subject, predicate and object.

Subjects, also referred to as resources, can be anything that is described by an RDF expression. A subject can be person, place or thing-though, typically, only an identifier of the subject is used in an actual RDF expression, not the person, place or thing itself. Examples of subjects might be "car," "Joe," "http://www.metatomix.com."

A predicate identifies a property of a subject. According to the RDF specification, this may be any "specific aspect, characteristic, attribute, or relation used to describe a resource." For the three exemplary subjects above, examples of predicates might be "make," "citizenship," "owner."

An object gives a "value" of a property. These might be "Ford," "United Kingdom," "Metatomix, Inc." for the subject and objects given in the prior paragraphs, forming the following RDF triples:

| Subject | Predicate | Object |
| --- | --- | --- |
| "car" | "make" | "Ford" |
| "Joe" | "citizenship" | "United Kingdom" |
| "http://metatomix.com" | "owner" | "Metatomix, Inc." |

Objects can be literals, i.e., strings that identify or name the corresponding property (predicate). They can also be resources. In the example above, rather than merely the string "Metatomix, Inc." further triples may be specified—presumably, ones identifying that company in the subject and giving details in predicates and objects.

A given subject may have multiple predicates, each predicate indexing an object. For example, a subject postal zip code might have an index to an object town and an index to an object state, either (or both) index being a predicate URI.

Listed below is a portion of a data set of the type with which the invention can be practiced. The listing contains RDF triples, here, expressed in extensible markup language (XML) syntax. Those skilled in the art will, of course, appreciate that RDF triples can be expressed in other syntaxes and that the teachings hereof are equally applicable to those syntaxes. Further, the listing shows only a sampling of the triples in a database 114, which typically would contain tens of thousands or more of such triples.

```
<rdf:RDF...xmlns="http://www.metatomix.com/postalCode/1.0#>
   <rdf:Description rdf:about="postal://zip#02886">
      <town>Warwick</town>
      <state>RI</state>
      <country>USA</country>
      <zip>02886</zip>
   <rdf:Description>
      <rdf:Description rdf:about="postal://zip#02901">
      <town>Providence</town>
      <state>RI</state>
      <country>USA</country>
      <zip>02901</zip>
   </rdf:Description>
```

Subjects are indicated within the listing using a "rdf: about" statement. For example, the second line of the listing defines a subject as a resource named "postal://zip#02886." That subject has predicates and objects that follow the subject declaration.

One predicate, <town>, is associated with a value "Warwick". Another predicate, <state>, is associated with a value "RI". The same follows for the predicates <country> and <zip>, which are associated with values "USA" and "02886," respectively. Similarly, the listing shows properties for the subject "postal://zip#02901," namely, <town> "Providence," <state> "RI," <country> "US" and <zip> "02901."

In the listing, the subjects and predicates are expressed as uniform resource indicators (URIs), e.g., of the type defined in Berniers-Lee et al, *Uniform Resource Identifiers (URI): Generic Syntax* (RFC 2396) (August 1998), and can be said to be expressed in a form <scheme>://<path>#<fragment>. For the subjects given in the example, <scheme> is "postal," <path> is "zip," and <fragment> is, for example, "02886" and "02901."

The predicates, too, are expressed in the form <scheme>://<path>#<fragment>, as is evident to those in ordinary skill in the art. In accord with XML syntax, the predicates in lines two, et seq., of the listing must be interpreted as suffixes to the string provided in the namespace directive "xmlns=http://www.metatomix.com/postalCode/1.0#" in line one of the listing. This results in predicates that are formally expressed as: "http://www.metatoinix.com/postalCode/1.0#town," "http ://www.metatomix.com/postalCode/1.0#state," "http://www.metatomix.com/postalCode/1.0#country" and "http://www.metatomix.com/postalCode/1.0#zip."

Hence, the <scheme> for the predicates is "http" and <path> is "www.metatomix.com/postalCode/1.0." The <fragment> portions are <town>, <state>, <country> and <Zip>, respectively. It is important to note that the listing is in some ways simplistic in that each of its objects is a literal value. Commonly, an object may itself be another subject, with its own objects and predicates. In such cases, a resource can be both a subject and an object, e.g., an object to all "upstream" resources and a subject to all "downstream" resources and properties. Such "branching" allows for complex relationships to be modeled within the RDF triple framework.

Figure 2:
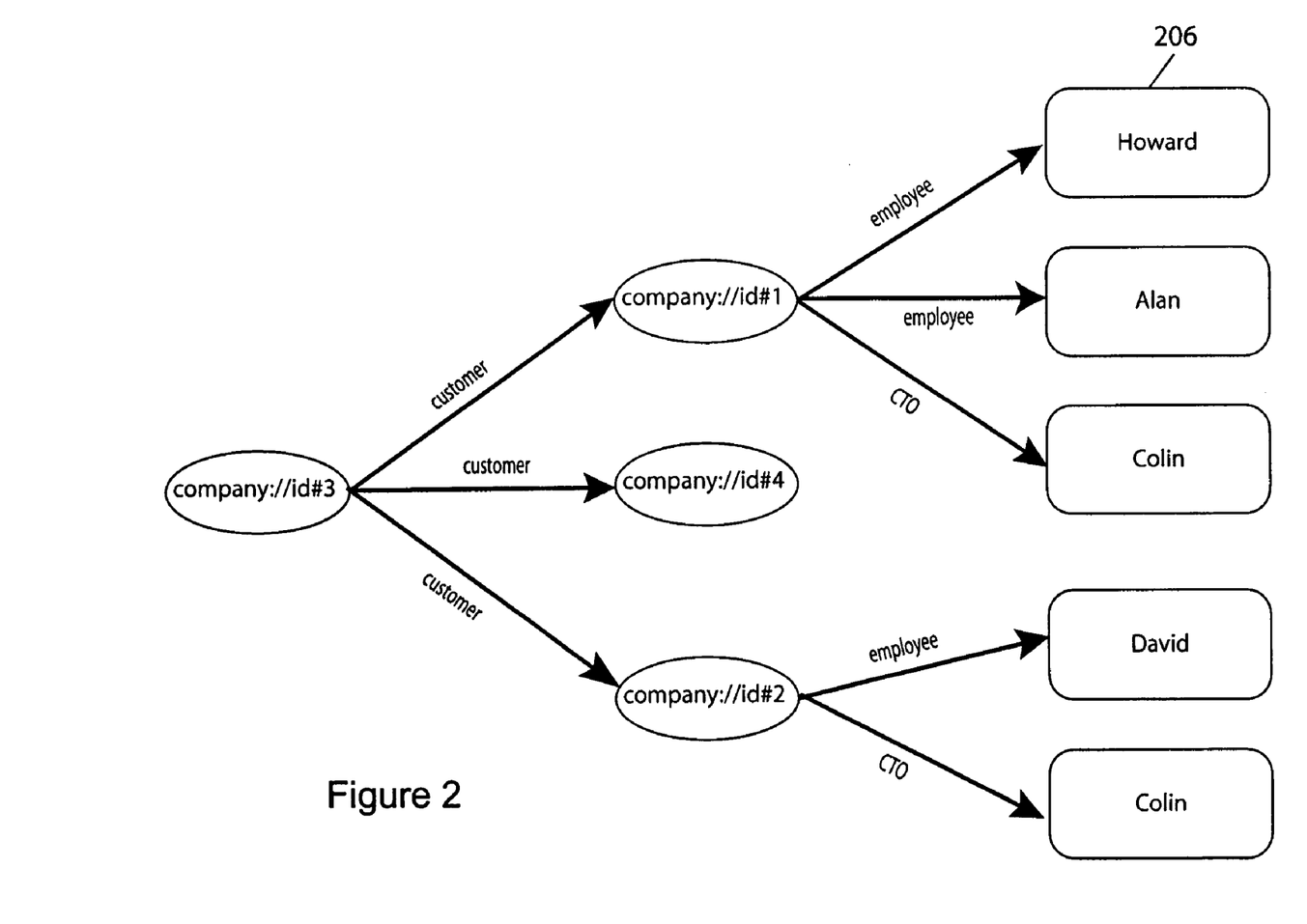
FIG. 2 depicts a directed graph representing data triples of the type maintained in a data store according to the invention.

FIG. 2 depicts a directed graph composed of RDF triples of the type stored by the illustrated data store 114, here, by way of non-limiting example, triples representing relationships among four companies (id#1, id#2, id#3 and id#4) and between two of those companies (id#1 and id#2) and their employees. Per convention, subjects and resource-type objects are depicted as oval-shaped nodes; literal-type objects are depicted as rectangular nodes; and predicates are depicted as arcs connecting those nodes.

Figure 1A:
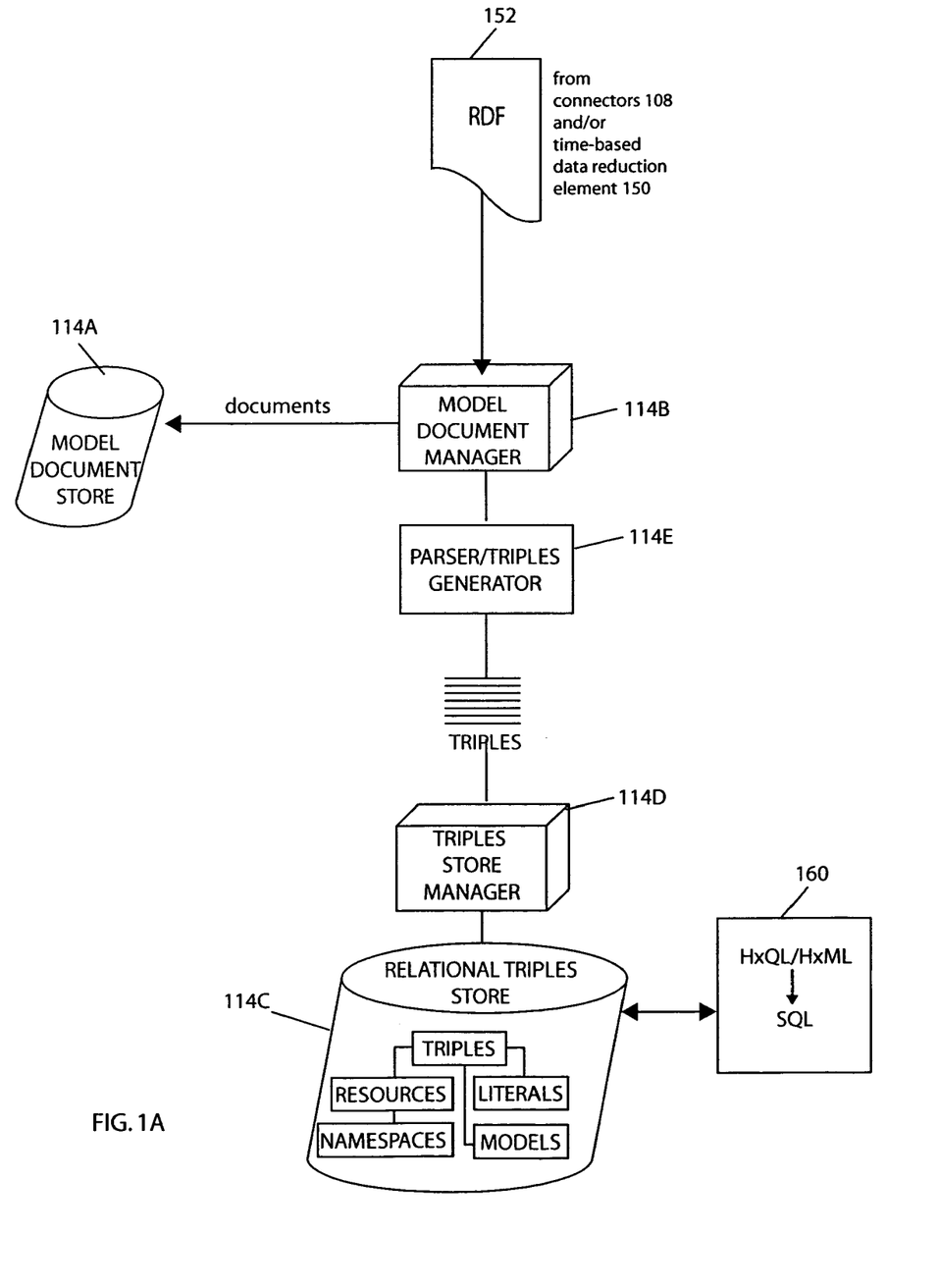
FIG. 1A depicts an architecture for a hologram data store according to the invention, e.g., in the system of claim 1.

FIG. 1A depicts an architecture for a preferred hologram data store 114 according to the invention. The illustrated store 114 includes a model document store 114A and a model document manager 114B. It also includes a relational triples store 114C, a relational triples store manager 114D, and a parser 114E interconnected as shown in the drawing.

As indicated in the drawing, RDF triples maintained by the store 114 are received—from the legacy databases 140 (via connectors 108) and/or from time-based data reduction module 150 (described below)—in the form of document objects, e.g., of the type generated from a Document Object Model (DOM) in a JAVA, C++ or other application. In the illustrated embodiment, these are stored in the model document store 114A as such (i.e., document objects) particularly, using the tables and inter-table relationships shown in FIG. 1B (see dashed box labelled 114B).

The model document manager 114B manages storage/retrieval of the document object to/from the model document store 114A. In the illustrated embodiment, the manager 114B comprises the Slide content management and integration framework, publicly available through the Apache Software Foundation. It stores (and retrieves) document objects to (and from) the store 114A in accord with the WebDAV protocol. Those skilled in the art will, of course, appreciate that other applications can be used in place of Slide and that document objects can be stored/retrieved from the store 114A in accord with other protocols, industry-standard, proprietary or otherwise.

However, use of the WebDAV protocol allows for adding, updating and deleting RDF document objects using a variety of WebDAV client tools (e.g., Microsoft Windows Explorer, Microsoft Office, XML Spy or other such tools available from a variety of vendors), in addition to adding, updating and deleting document objects via connectors 108 and/or time-based data reduction module 150. This also allows for presenting the user with a view of a traversable file system, with RDF documents that can be opened directly in XML editing tools or from Java programs supporting WebDAV protocols, or from processes on remote machines via any HTTP protocol on which WebDAV is based.

RDF triples received by the store 114 are also stored to a relational database, here, store 114C, that is managed and accessed by a conventional relational database management system (RDBMS) 114D operating in accord with the teachings hereof. In that database, the triples are divided into their constituent components (subject, predicate, and object), which are indexed and stored to respective tables in the manner of a "hashed with origin" approach. Whenever an RDF document is added, updated or deleted, a parser 114E extracts its triples and conveys them to the RDBMS 114D with a corresponding indicator that they are to be added, updated or deleted from the relational database. Such a parser 114E operates in the conventional manner known in the art for extracting triples from RDF documents.

Figure 1B:
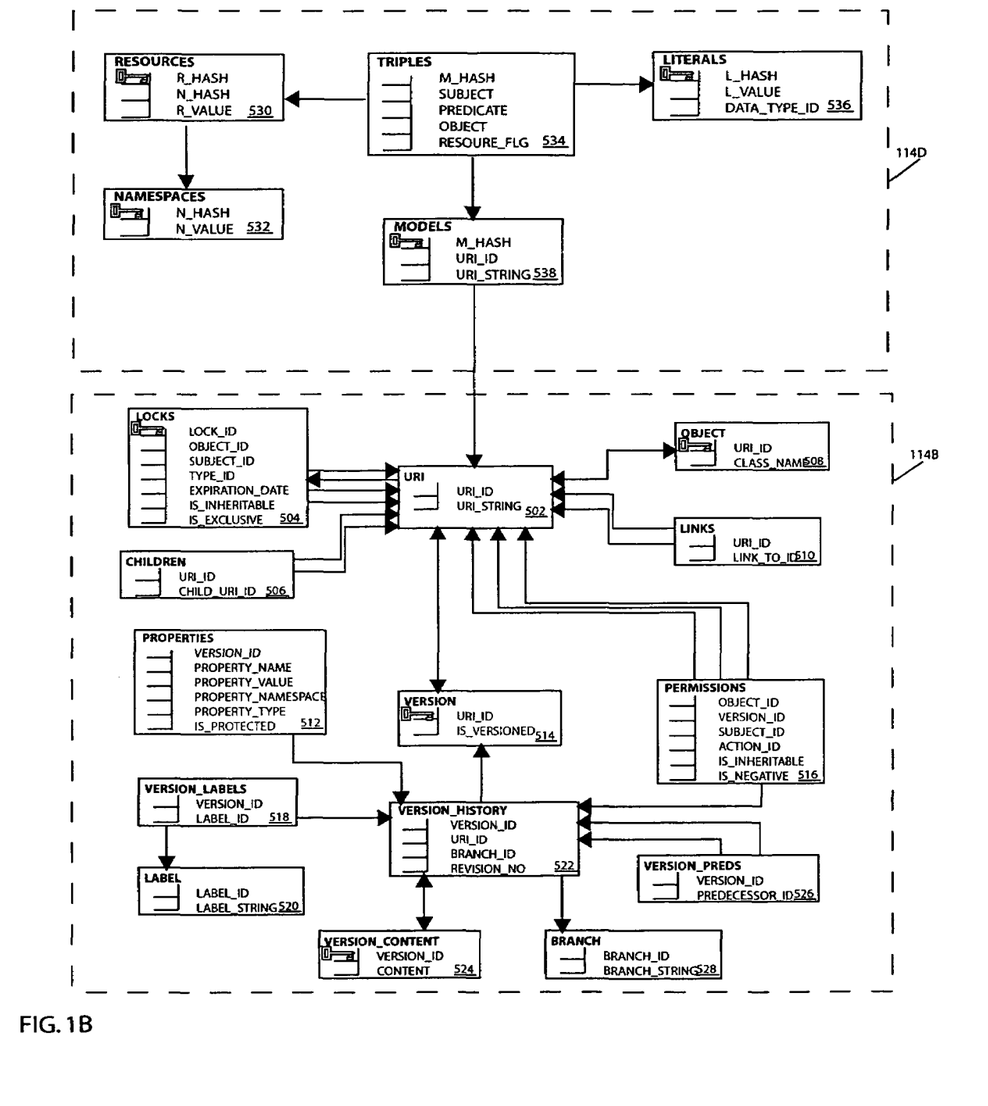
FIG. 1B depicts the tables in a model store and a triples store of the hologram data store of FIG. 1A.

The illustrated database store 114C has five tables interrelated as particularly shown in FIG. 1B (see dashed box labelled 114C). In general, these tables rely on indexes generated by hashing the triples' respective subjects, predicates and objects using a 64-bit hashing algorithm based on cyclical redundancy codes (CRCs)—though, it will be appreciated that the indexes can be generated by other techniques as well, industry-standard, proprietary or otherwise.

Referring to FIG. 1B, the "triples" table 534 maintains one record for each stored triple. Each record contains an aforementioned hash code for each of the subject, predicate and object that make up the respective triple, along with a resource flag ("resource_flg") indicating whether that object is of the resource or literal type. Each record also includes an aforementioned hash code ("m_hash") identifying the document object (stored in model document store 114A) from which the triple was parsed, e.g., by parser 114E.

In the illustrated embodiment, the values of the subjects, predicates and objects are not stored in the triples table. Rather, those values are stored in the resources table 530, namespaces table 532 and literals table 536. Particularly, the resources table 530, in conjunction with the namespaces table 532, stores the subjects, predicates and resource-type objects; whereas, the literals table 536 stores the literal-type objects.

The resources table 530 maintains one record for each unique subject, predicate or resource-type object. Each record contains the value of the resource, along with its aforementioned 64-bit hash. It is the latter on which the table is indexed. To conserve space, portions of those values common to multiple resources (e.g., common <scheme>:// <path> identifiers) are stored in the namespaces table 532. Accordingly the field, "r_value," contained in each record of the resources table 530 reflects only the unique portion (e.g., <fragment> identifier) of each resource.

The namespaces table 532 maintains one record for each unique common portion referred to in the prior paragraph (hereinafter, "namespace"). Each record contains the value of that namespace, along with its aforementioned 64-bit hash. As above, it is the latter on which this table is indexed.

The literals table 536 maintains one record for each unique literal-type object. Each record contains the value of the object, along with its aforementioned 64-bit hash. Each record also includes an indicator of the type of that literal (e.g., integer, string, and so forth). Again, it is the latter on which this table is indexed.

The models table 538 maintains one record for each RDF document object contained in the model document store 114A. Each record contains the URI of the corresponding document object ("uri_string"), along with its aforementioned 64-bit hash ("m_hash"). It is the latter on which this table is indexed. To facilitate associating document objects identified in the models table 538 with document objects maintained by the model document store 114A, each record of the models table 538 also contains the ID of the corresponding document object in the store 114A. That ID can be assigned by the model document manager 114B, or otherwise.

From the above, it can be appreciated that the relational triples store 114C is a schema-less structure for storing RDF triples. As suggested by Melnik, supra, triples maintained in that store can be reconstituted via an SQL query. For example, to reconstitute the RDF triple having a subject equal to "postal://zip#02886", apredicate equal to "http://www.metatomix.com/postalCode/1.0#town ", and an object equal to "Warwick", the following SQL statement is applied:

```
SELECT m.uri_string, t.resource_flg,
    concat (n1.n_value r1.r_value) as subj,
    concat (n2.n_value r2.r_value) as pred,
    concat (n3.n_value r3.r_value),
    1.1_value
FROM triples t, models m, resources r1, resources r2, namespaces n1, namespaces n2
    LEFT JOIN literals 1 on t.object=1.1_hash
    LEFT JOIN resources r3 on t.object=r3.r_hash
    LEFT JOIN namespaces n3 on r3.r_value=n3.n_value
WHERE t.subject=r1.r_hash AND r1.n_hash=n1.n_hash AND
    t.predicate=r2.r_hash AND r2.n_hash=n2.n_hash AND
    m.uri_id=t.m_hash AND t.subject=hash("postal://zip#02886") AND
    t.predicate=hash('http://www.metatomix.com/postalcode/1.0#town') AND
    t.object=hash('warwick')
```

Those skilled in the art will, of course, appreciate that RDF documents and, more generally, objects maintained in the store 114 can be contained in other stores—structured relationally, hierarchically or otherwise—as well, in addition to or instead of stores 114A and 114C.

Figure 3:
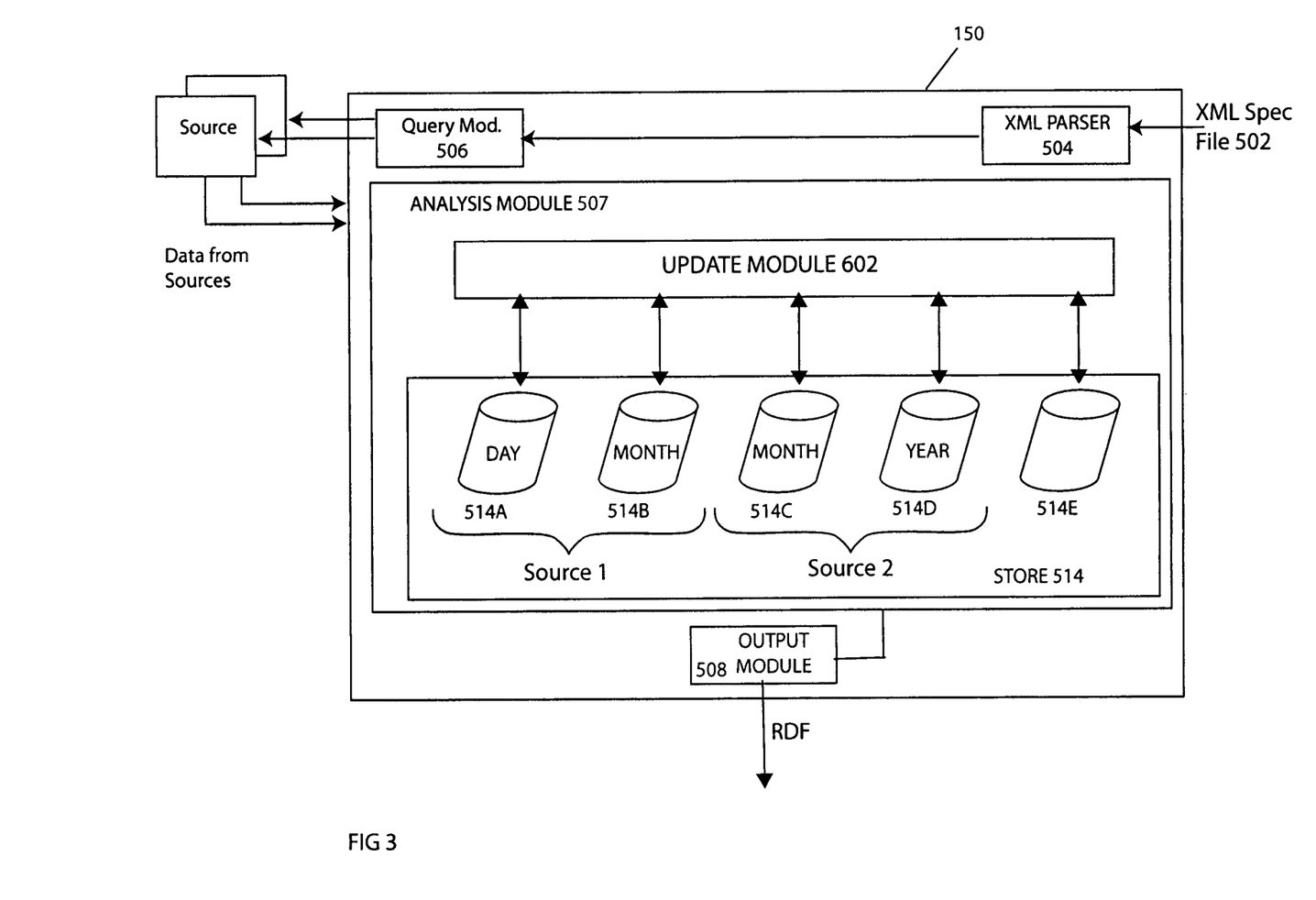
FIG. 3 is a functional block diagram of a time-wise data reduction module in a system according to the module.

Referring to FIG. 3, time-wise data reduction component 150 comprises an XML parser 504, a query module 506, an analysis module 507 and an output module 508. The component 150 performs a time-wise reduction on data from the legacy databases 140. In some embodiments, that data is supplied to the component 150 by the connectors 108 in the form of RDF documents. In the illustrated embodiment, the component 150 functions, in part, like a connector itself—obtaining data directly from the legacy databases 140 before time-wise reducing it.

Regardless, illustrated component 150 outputs the reduced data in the form of RDF triples contained in RDF documents. In the illustrated embodiment, these are stored in the model store 114A (and the underlying triples, in relational store 114C), alongside the RDF documents (and their respective underlying triples) from which the reduced data was generated. This facilitates, for example, reporting of the time-wise reduced data, e.g., by the framework server 116, since that data is readily available for display to the user and does not require ad hoc generation of data summaries in response to user requests.

Module 504 parses an XML file 502 which specifies one or more sources of data to be time-wise reduced. That file may be supplied by the framework server 116, or otherwise. The specified sources may be legacy databases, data streams, or otherwise 140. They may also be connectors 108, e.g., identified by symbolic name, virtual port number, or otherwise. Along with the data source identifier(s), the XML specification file 502 specifies the data items which are to be time-wise reduced. These can be field names, identifiers or otherwise.

The XML file 502 further specifies the time periods or epochs over which data is to be time-wise reduced. These can be seconds, minutes, hours, days, months, weeks, years, and so forth, depending on the type of data to be reduced. For example, if the data source contains hospital patient data, the specified epochs may be weeks and months; whereas, if the data source contains web site access data, the specified epochs may be hours and days.

The parser component 504 parses the XML file 502 to discern the aforementioned data source identifiers, field identifiers, and epochs. To this end, the parser 504 may be constructed and operated in the conventional manner known in the art.

The query module 506 generates queries in order to obtain the field specified in the XML specification file 502. It queries the identified data source(s) in the manner appropriate to those sources. For example, the processing module 510 queries SQL-compatible databases using an SQL query. Other data sources are queried via their respective applications program interfaces (APIs), or otherwise. In embodiments where source data is supplied to the component 150 by the connectors 108, querying may be performed explicitly or implicitly by those connectors 108. Moreover, querying might not need to be performed on some data sources, e.g., data streams, from which data is broadcast or otherwise available without the need for request. In such instances, filtering may be substituted for querying in order that the specific fields or other items of data specified in the XML file are obtained.

The analysis module 507 compiles time-wise statistics or summaries for each epoch specified in the XML file 502. To this end, it maintains for each such epoch one or more running statistics (e.g., sums or averages) for each data field specified by the file 502 and received from the sources. As datum for each field are input, the running statistics for that field are updated. Such updating can include incrementing a count maintained for the field, recomputing a numerical total, modifying a concatenated string, and so forth, as appropriate to the type of the underlying field data.

By way of example, if the XML specification file 502 specifies that a summary of the number of "hits" of a web site are to be maintained on a per day basis, the analysis module 507 would maintain a store reflecting the number of hits thus far counted on a given day for that web site (e.g., based on data received from a source identifying each hit as it occurs, or otherwise). When no further data is received from the source for that day, the module generates RDF output (via the output module 508) reflecting that number of counts (or other specified summary information) for output to the hologram store 114.

If the XML file 502 additionally specifies that summary data of web site accesses is to be maintained on a per month basis, the analysis module 507 would maintain a separate store of counts for the month for which data is currently being received from the source. As above, when no further data is received from the source for that month, the module generates RDF output reflecting the total number of counts (or other specified summary information) for output to the hologram store 114.

As an alternative to simultaneously updating stores for each of multiple epochs as new data is received, other embodiments of the invention increment (or otherwise update) the store for the epoch of shortest relevant duration (e.g., the per day store) as each such data item is received. Additional stores reflecting epochs of longer duration (e.g., the per month store) are only updated as those for the shorter duration epochs are completed.

An analysis module 507 according to a preferred practice of the invention maintains stores for each epoch for which running statistics (.i.e., time-wise summaries) are to be maintained. In order to accommodate the maintenance of running statistics for epochs from a plurality of sources, the stores 514 can be allocated from an array, a pointer table or other data structure, with specific allocations made depending on the specific number of running statistics being tracked.

For example if an XML file 502 specifies that access statistics are to be maintained for a web site on daily and monthly bases using data from a first data source, and that running statistics for the numbers of visitors to a retail store are to be maintained on monthly and yearly bases from data from a second data source, the analysis module 507 can maintain four stores: store 514A maintaining a daily count for the web site; store 514B maintaining a monthly count for the web site; store 514C maintaining a monthly account for the retail store; and store 514D maintaining a yearly count for the retail store. Each of the stores 514 is updated as corresponding data is received from the respective data sources.

Thus, continuing the above example, as data (in the form of records, packets, or so forth) are received from the first data source reflecting web site accesses on a given day, a count maintained in the first store 514A is incremented. When the received data begins to reflect accesses on the succeeding day, the output module 508 can generate one or more RDF triples reflecting a count for the (then-complete) prior day for storage in the hologram store 114. Concurrently, the store 514A can be reset to zero and the process restarted for tracking accesses on that succeeding day.

The second store 514B, i.e., that tracking the longer epoch for data from the first source, can be incremented in parallel with the first store 514A as web access data is received from the source or, alternatively, can be updated when the first store 514A is rolled over, i.e. reset for tracking statistics for each successive day. As above, when data received from the first source begins to reflect web accesses for a succeeding month (i.e., the period associated with the second store 514B), RDF triples can be generated to reflect web access statistics for the then-completed prior month, concurrently with zeroing the second store 514B for tracking of statistics for the succeeding month.

In this way, the analysis module 507 maintains running statistics for the epochs specified in the XML file 502, outputting RDF triples reflecting those statistics as data for each successive epoch is received. Those skilled in the art will appreciate that running statistics may be maintained in other ways, as well. For example, continuing the above example, in instances where data received from the first source is not received ordered by day (but, rather, is intermingled with respect to many days), multiple stores can be maintained—one for each day (or other epoch).

Referring again to FIG. 1A, the output module 508 generates RDF documents reflecting the summarized data stored in stores 514 for output to the hologram data store 114. This can be performed by generating and RDF stream ad hoc or, preferably, by utilizing native commands, e.g., of the Java programming language, to gather the epoch data into a document object model (DOM). In such a language, the DOM can be output in RDF format to the hologram store 114 directly.

A more complete understanding of the store 114 may be attained by reference to the aforementioned incorporated-by-reference applications.

Referring to copending, commonly assigned U.S. patent application Ser. No. 11/064438, filed this day herewith, entitled "Methods and Apparatus for Querying a Relational Data Store Using Schema-Less Queries," the teachings of which are incorporated herein by reference, the data store 14 supports a SQL-like query languages called HxQL and HxML. This allows retrieval of RDF triples matching defined criteria.

The data store 114 includes a graph generator (not shown) that uses RDF triples to generate directed graphs in response to queries (e.g., in HxQL or HxML form) from the framework server 116. These may be queries for information reflected by triples originating from data in one or more of the legacy databases 140 (one example might be a request for the residence cities of hotel guests who booked reservations on account over Independence Day weekend, as reflected by data from an e-Commerce database and an Accounts Receivable database). Such generation of directed graphs from triples can be accomplished in any conventional manner known the art (e.g., as appropriate to RDF triples or other manner in which the information is stored) or, preferably, in the manner described in co-pending, commonly assigned U.S. patent application Ser. No. 10/138,725, filed May 3, 2002, entitled METHODS AND APPARATUS FOR VISUALIZING RELATIONSHIPS AMONG TRIPLES OF RESOURCE DESCRIPTION FRAMEWORK (RDF) DATA SETS and Ser. No. 60/416,616, filed Oct. 7, 2002, entitled METHODS AND APPARATUS FOR IDENTIFYING RELATED NODES IN A DIRECTED GRAPH HAVING NAMED ARCS, the teachings of both of which are incorporated herein by reference. Directed graphs so generated are passed back to the server 16 for presentation to the user.

According to one practice of the invention, the data store 114 utilizes genetic, self-adapting, algorithms to traverse the RDF triples in response to queries from the framework server 116. Though not previously known in the art for this purpose, such techniques can be beneficially applied to the RDF database which, due to its inherently flexible (i.e., schema-less) structure, is not readily searched using traditional search techniques. To this end, the data store utilizes a genetic algorithm that performs several searches, each utilizing a different methodology but all based on the underlying query from the framework server, against the RDF triples. It compares the results of the searches quantitatively to discern which produce(s) the best results and reapplies that search with additional terms or further granularity.

Referring back to FIG. 1, the framework server 116 generates requests to the data store 114 (and/or indirectly to the legacy databases via connectors 108, as discussed above) and presents information therefrom to the user via browser 118. The requests can be based on HxQL or HxML requests entered directly by the user though, preferably, they are generated by the server 116 based on user selections/responses to questions, dialog boxes or other user-input controls. In a preferred embodiment, the framework server includes one or more user interface modules, plug-ins, or the like, each for generating queries of a particular nature. One such module, for example, generates queries pertaining to marketing information, another such module generates queries pertaining to financial information, and so forth.

In some embodiments, queries to the data store are structured on a SQL based RDF query language, in the general manner of SquishQL, as known in the art.

In addition to generating queries, the framework server (and/or the aforementioned modules) "walks" directed graphs generated by the data store 114 to present to the user (via browser 118) any specific items of requested information. Such walking of the directed graphs can be accomplished via any conventional technique known in the art. Presentation of questions, dialog boxes or other user-input controls to the user and, likewise, presentation of responses thereto based on the directed graph can be accomplished via conventional server/browser or other user interface technology.

In some embodiments, the framework server 116 permits a user to update data stored in the data store 114 and, thereby, that stored in the legacy databases 140. To this end, changes made to data displayed by the browser 118 are transmitted by server 116 to data store 114. There, any triples implicated by the change are updated in store 114C, as are the corresponding RDF document objects in store 114A. An indication of these changes can be forwarded to the respective legacy databases 140, which utilize the corresponding API (or other interface mechanisms) to update their respective stores. (Likewise, changes made directly to the store 114C as discussed above, e.g., using a WebDAV client, can be forwarded to the respective legacy database.)

In some embodiments, the server 16 can present to the user not only data from the data store 114, but also data gleaned by the server directly from other sources. Thus, for example, the server 116 can directly query an enterprise web site for statistics regarding web page usage, or otherwise.

A further understanding of the operation of the framework server 116 may be attained by reference to the appendix filed with U.S. patent application Ser. No. 09/917,264, filed Jul. 27, 2001, and entitled "Methods and Apparatus for Enterprise Application Integration," which appendix is incorporated herein by reference.

Described herein are methods and apparatus meeting the above-mentioned objects. It will be appreciated that the illustrated embodiment is merely an example of the invention and that other embodiments, incorporating changes to those described herein, fall within the scope of the invention, of which we claim:

The invention claim is:

1. A method of time-wise data reduction and storage, comprising
   A querying one or more data sources,
   B selecting an epoch,
   C generating a time-wise statistic based on data received from the data sources in response to querying, where the time-wise statistic is generated over said selected epoch and comprises a running statistic for the data, D generating for said epoch, one or more RDF triples characterizing the time-wise statistic, and E storing the RDF triples to one or more data stores, along with further RDF triples characterizing the data from which the summaries were generated, where the one or more data stores include any of a hierarchical data store and a relational data store.

2. The method of claim 1, comprising generating a time-wise statistic based on data received from the data sources with respect to multiple epochs of differing length.

3. The method of claim 1, comprising querying one or more data sources in an SQL format.

4. The method of claim 1, comprising parsing an XML file that identifies one or more of the data sources, one or more fields of data for which time-wise statistics are to be generated, and/or one or more epochs for which those time-wise statistics are to be generated.

5. The method of claim 1, comprising responding to data received from a data source by updating a store associated with an epoch of shorter duration.

6. The method of claim 5, comprising updating a store associated with an epoch of longer duration based on information maintained in an epoch of shorter duration.

7. The method of claim 1, comprising outputting the one or more RDF triples in one or more RDF document objects.

8. The method of claim 1, comprising storing the RDF triples in a relational data store organized according to a hashed with origin approach.

9. A method of time-wise data reduction and storage, comprising

A at least one of querying and filtering data from one or more data sources,

B selecting one or more epoch,

C generating a time-wise statistic for data received in said selected epochs, the time-wise statistic comprising a running statistic for the data, and D generating RDF document objects comprising one or more RDF triples characterizing the time-wise statistic, E storing the RDF documents to a first, hierarchical data store, and F storing the triples therein to a second, relational data store.

10. The method of claim 9, comprising querying one or more data sources in an SQL format.

11. The method of claim 9, comprising parsing an XML file that identifies one or more of the data sources, one or more fields of data for which time-wise statistics are to be generated, and/or one or more epochs for which those time-wise statistics are to be generated.

12. The method of claim 9, comprising responding to data received from a data source by updating a store associated with an epoch of shorter duration.

13. The method of claim 12, comprising updating a store associated with an epoch of longer duration based on information maintained in an epoch of shorter duration.

14. The method of claim 9, comprising generating a display or other presentation based on the RDF triples characterizing the time-wise statistic.

15. The method of claim 9, wherein the selection of one or more epochs comprises selecting two or more epochs of differing lengths.

16. The method of claim 9, comprising storing the RDf document objects in accord with a WebDAV protocl.

* * * * *